March 24, 1970     J. L. BEAUCHAMP     3,502,867
METHOD AND APPARATUS FOR MEASURING ION INTERRELATIONSHIPS
BY DOUBLE RESONANCE MASS SPECTROSCOPY
Filed Aug. 1, 1966     2 Sheets-Sheet 1
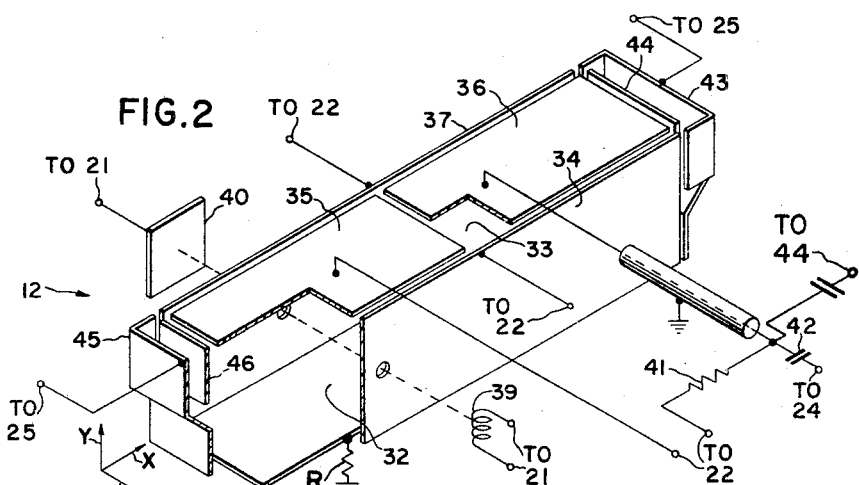
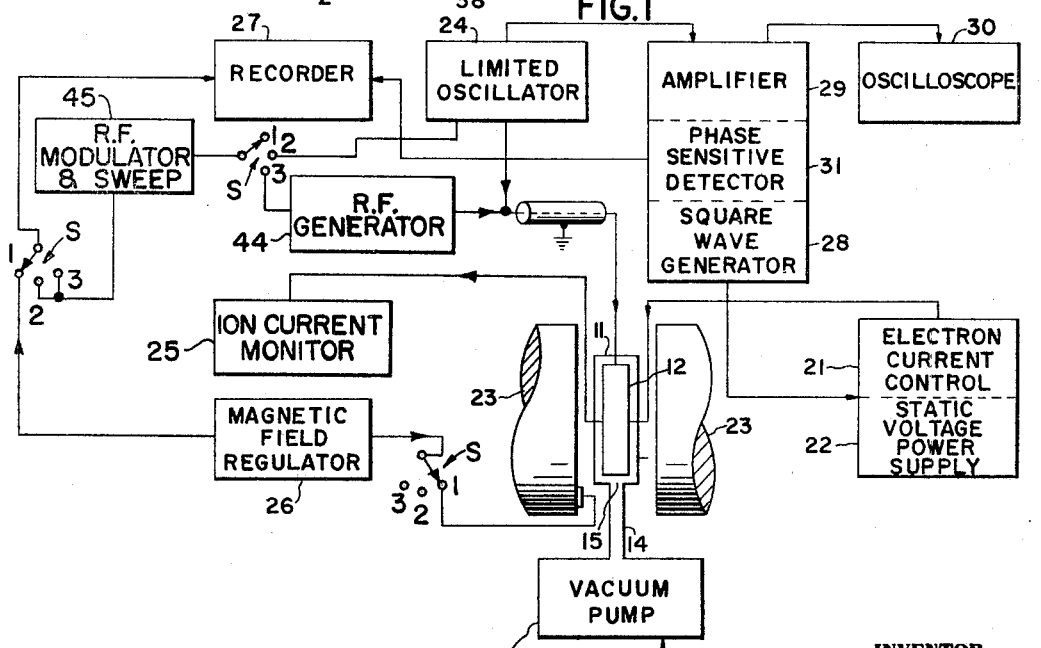
INVENTOR
JESSE L. BEAUCHAMP
BY
ATTORNEY FIG. 6
FIG. 4A
FIG. 3
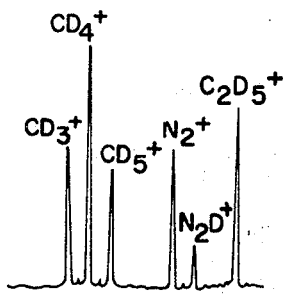
FIG. 4B
FIG. 5
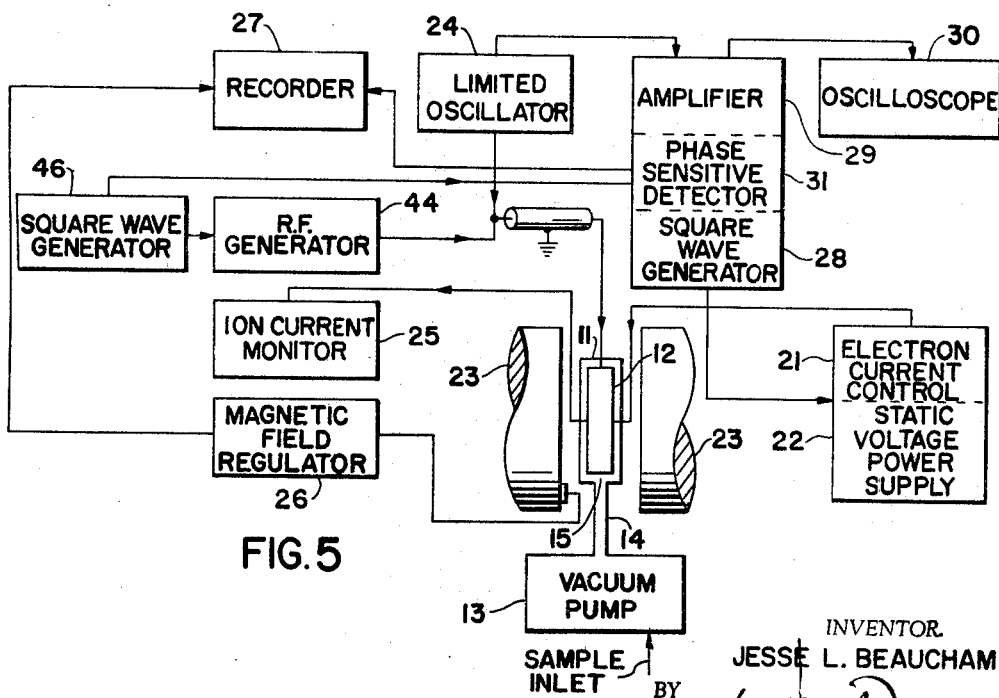

United States Patent Office
3,502,867
Patented Mar. 24, 1970

3,502,867
METHOD AND APPARATUS FOR MEASURING ION INTERRELATIONSHIPS BY DOUBLE RESONANCE MASS SPECTROSCOPY
Jesse L. Beauchamp, Menlo Park, Calif., assignor to Varian Associates, Palo Alto, Calif., a corporation of California
Filed Aug. 1, 1966, Ser. No. 569,277
H01j 39/34
U.S. Cl. 250—41.9                10 Claims

ABSTRACT OF THE DISCLOSURE

A double resonance mass spectroscopy method and apparatus wherein two radio frequency electric fields are simultaneously applied to a mixture of ionized particles passing through the apparatus so as to excite to resonance certain ones of said particles and enable the detection thereof. Additionally, one of said electric fields is modulated so that the ion-molecular coupling or other interrelationship between the resonant particles can be determined as a result of the effect produced in one type of particle by the modulation of the field which excites the other type of particle.

---

This invention relates to mass spectrometry and, more particularly, to an improvement in ion resonance mass spectrometers.

In one form of ion resonance spectrometer, i.e., a cyclotron resonance mass spectrometer, a charged particle or positive ion moving in a uniform magnetic field, B, describes a circular orbit in a plane perpendicular to B with an angular frequency or "cyclotron frequency," $\omega_c$, given simply by $$\omega_c = \frac{zeB}{m} \text{ (MKS)} \quad (1)$$

where $z$ is the number of charges per ion, $e$ is the electronic charge, B is the magnetic field strength, and $m$ the particle mass. When an alternating electric field $E(t)$ is applied with a substantial component normal to B at the cyclotron frequency $\omega_c$, the ions absorb energy from the alternating electric field and are accelerated to larger velocities and orbital radii.

The absorption of energy from $E(t)$ at the cyclotron resonance frequency can be conveniently detected, for example by using a limited oscillator-detector or bridge circuit, since the values of $\omega_c$ for positive ions of low mass fall in the range of 100–300 kc. for reasonable laboratory magnetic field. For example, $$\frac{\omega_c}{2\pi} = 170 \text{ kc.} \quad (2)$$

for $N_2^+$ (mass 28) with $B=3000$ gauss. The accurate measurement of $\omega_c$ for known values of B yields a value for the mass $m$; thus positive ion cyclotron resonance has been applied, for example, to mass analysis in the omegatron mass spectrometer. One form of cyclotron mass spectrometer is described in Sommer et al., Physical Review, vol. 82, page 697 (1951) and another in Patent application U.S. Ser. No. 456,173, now United States Patent No. 3,390,265, filed by Peter Llewellyn on May 17, 1965, entitled, "Mass Spectrometer." The analysis of the lineshape of a cyclotron resonance absorption yields considerable information in addition to the mass determination.

When the ions accelerated by $E(t)$ collide with other particles, they lose some of their excess energy. A mixture of ions and neutral molecules in the presence of B and $E(t)$ then reaches a steady state condition in which the energy gained by the ions from $E(t)$ between collisions is lost to the neutral molecules in collisions. The average energy of the ions in this steady state will depend on the magnitude of $E(t)$, the collision frequency, and the efficiency of energy transfer upon collision. Since the width of a cyclotron resonance absorption line depends on the number of collisions per unit time, an analysis of cyclotron resonance lineshapes can yield cross sections and energy-transfer efficiencies for ion-molecule collisions.

When a mixture of several ion components as well as neutral species is present in a cyclotron resonance experiment, the equations of motion for each ion in the mixture can be coupled by a variety of interesting processes including charge transfer and chemical reaction.

A novel and convenient multiple resonance technique useful in a mass spectrometer apparatus for the study of charge transfer or other types of ion-molecule reaction has been disclosed and claimed in a U.S. patent application Ser. No. 566,973 entitled, "Mass Spectrometer," filed by John D. Baldeschwieler on July 21, 1966. In a cyclotron mass spectometer, one type of ion is irradiated with an R.F. electric field $E_1(t)$ at the ion's cyclotron resonance frequency $\omega_{c1}$ and the absorption of energy by the cyclotron resonance of said ions is measured. Another type of ion is simultaneously irradiated or heated with an R.F. electric field $E_2(t)$ at the other ion's cyclotron resonance frequency $\omega_{c2}$. The changes in the lineshape and/or intensity of the absorption line of said first ion is utilized as an indication of charge transfer or other types of ion-molecule reactions. The coupling between ions is dependent upon the translational energy of the impacting ions. The application of the second R.F. electric field results in a change in the translational energy of the second group of ions.

The purpose of the present invention is to provide an improved form of double resonance technique wherein the said other type of ion is irradiated with an R.F. electric field which is modulated or pulsed at a lower frequency, and the absorption output signal is coupled to a phase detector system to obtain a final output signal directly related to the difference between the absorption signal obtained with and without the double resonance.

It is, therefore, an object of the present invention to provide a novel mass spectrometer apparatus utilizing an improved form of double resonance of charged particles undergoing resonance absorption.

The principal feature of the present invention is the provision of a mass spectrometer having novel means for simultaneously applying multiple radio-frequency electric fields to the charged particles therein to produce simultaneous resonance of at least two separate groups or types of charged particles, the irradiation of one type being evidenced by a change in the absorption line of the other type, one of said electric fields being applied in a periodic pulsed manner to thereby obtain a more easily determined output signal.

A further understanding of this invention may be had by referring to the following description and claims, taken in conjunction with the drawings in which:

FIG. 1 is a block diagram of a known form of mass spectrometer,

FIG. 2 is a diagrammatic perspective view partially broken away showing the ionizing and analyzing structure of one known form of cyclotron mass spectrometer useful in practicing the present invention, FIG. 3 is a cyclotron resonance spectrum of a mixture of $CD_4^+$ and $N_2^+$, FIGS. 4B and 4A are cyclotron resonance lines of $N_2D^+$ with and without the double resonance technique, respectively, FIG. 5 is a block diagram showing one embodiment of the present invention for permorming the modulated double resonance technique, and FIG. 6 is an example of an output signal obtained from the system of FIG. 5.

Referring now to FIG. 1 there are disclosed various components of the mass spectrometer of a known type. This mass spectrometer is a modification of the one described in the above U.S. Patent No. 3,390,265 and presently being sold under the trademark Syrotron, by Varian Associates of Palo Alto, Calif.

The mass spectrometer has an evacuable envelope 11 containing an elongated structure 12 in which ionization and subsequent analysis occur. Evacuation to a very low pressure, typically $10^{-8}$–$10^{-9}$ torr prior to sample introduction, is by means of a suitable vacuum pump 13. Ions are produced within the structure 12 within a first region by the impact of electrons on molecules of the gas sample under study. As will be explained in more detail below, an electron stream passes through the iorizing region and is ultimately collected on an electron collector. The electron current is monitored by suitable control means 21 to provide stable electron emission—hence, ion current.

A small electric field is applied to the ion producing region in a $-y$ direction by means of a static voltage power supply 22 and the ions therein, irrespective of mass-to-charge ratio, will be caused to move continually in a $+x$ direction at a constant rate of velocity to an analyzing region where the ions are trapped by the combined action of an electrostatic field provided by the static voltage power supply 22 and a magnetic field H provided in the $-z$ direction by the magnet poles 23.

An oscillating electric field E at a frequency $\omega_c$ is produced across the second or analyzing region by means of a limited oscillator 24 and those ions, that is, ions whose mass-to-charge ratio generally satisfy the equation $$\omega_c = \frac{eB}{m} \quad (3)$$

will absorb energy from the oscillating field and will pursue an ever-expanding spiral path whose origin moves at a constant velocity in the $+x$ direction. The net amount of energy absorbed by these resonance ions is detected in a suitable circuit and without resonant ion collection. Nonresonant ions will travel with cycloidal motion, the origin of which moves in the positive $x$ direction, due to the interaction between the static magnetic and static electric fields as described in the aforementioned Patent No. 3,390,265 until ultimately they pass through the second region and are collected. The number of nonresonant ions so collected may be monitored in a suitable measuring circuit 25 permitting, in the absence of resonance, total ion current to be monitored.

Ions of differing charge-to-mass ratio may be brought into resonance with the oscillating field E by varying the frequency $\omega_c$ of the oscillating field or the strength B of the magnetic field, or both. Means 26 are provided for regulating the magnetic field intensity, such as by magnet shim coils, providing, for fixed frequency $\omega_c$, a linear readout of mass-to-charge versus field strength B and, when used with $x$–$y$ recorder 27, a linear mass-to-charge versus position readout.

The oscillating voltage E required is derived from the limited oscillator 24 and, where resonant absorption takes place in the analyzing region, a change in the oscillating level occurs. In order to detect these small changes a modulation method is employed. Modulation of the magnetic field, the frequency, the electron current and the electrode voltages have all been successfully used. Modulation of the electrode voltages is accomplished by the provision of a square wave or other pulse type generator 28 connected to the static voltage power supply 22, thence to the analyzing region. At resonance, the signal will be an amplitude modulated radio frequency from the limited oscillator 24. This signal is detected and amplified at amplifier 29 and can either be monitored on an oscilloscope 30 or fed to a phase sensitive detector 31. This compares the output signal against the square wave and gives an output to the recorder 27 proportional to the absorption in phase with the modulation originally fed to the static voltage power supply 22.

Referring now to FIG. 2 the ion producing and analyzing structure comprises a plurality of spaced electrodes arranged about an axis and defining a first 32 and second 33 region spaced from each other along the $x$-axis. The structure is four-sided, of rectangular cross section and includes a first plate 34 forming a first side, a second 35 and third plate 36 forming a second side, a fourth plate 37 forming a third side and a fifth plate 38 forming a fourth side. In a typical embodiment all the plates are of nonmagnetic metal such as molybdenum or rhodium plated beryllium copper. Thus there is provided along the $x$-axis a first or ion producing region defined by plate 35 and a portion of plates 34, 37 and a second or analyzing region defined by plate 36 and portions of plates 34, 37 and 38.

An electron gun including a filament 39 is mounted within envelope 11 and discharges a stream of electrons, typically 2 microamps, in a $-z$ direction parallel to the magnetic field B through an aperture in plate 34 into region 32 and thence through an aperture in plate 37 onto a plate 40 for collection of electrons. As the electron stream passes through region 32 it ionizes a portion of the sample gas molecules which have found their way into region 32. It is to be understood that gas molecules can be admitted and ionization accomplished in region 32 in manners other than as illustrated.

A static voltage is applied between plate 35 and plate 38 producing a static electrical field in the $-y$ direction in region 32 which is transverse to the $x$-axis and the magnetic lines of force in the $-z$ direction established between the poles 23. Similarly, a static voltage is applied between plate 36 and the plate 38 through a series connected resistor 41 producing within region 33 a static electrical field in the $-y$ direction which is transverse to the $x$-axis and to the magnetic lines of force in the $-z$ direction. The combined action of the magnetic and static electric fields causes positive ions formed in region 32, irrespective of their mass-to-charge ratio, to move in a cycloidal motion of small amplitude with respect to the dimensions of structure 12 about the $x$-axis, at constant velocity, typically 100–500 cm./sec., in the $+x$ direction, from region 26 into region 33. By suitable changes in the static electrical fields and the magnetic field, negative ions may be made to behave in a similar manner.

An R.F. voltage, typically 100 millivolts, is applied between plate 36 and ground through a capacitor 42 producing an oscillating electrical field E within region 33 which is transverse to the magnetic lines of force and the $x$-axis. As ions move through region 33 those ions in resonance with the frequency $\omega_c$ of the oscillating field E will gain energy therefrom and pursue a trajectory in the nature of a continually expanding spiral whose origin, due to the action of the static field, continually moves linearly in the $+x$ direction. The net amount of energy absorbed by the resonant ions is detected and amplified as explained above. The capacitor 42 connects to a tuned circuit of high impedance forming, with the capacitance of the structure 12 and the tuned circuit, the frequency determining components of the limited oscillator 24.

Most of the resonant ions are ultimately discharge on the plates 34, 36, 37 and 38. In the presence of the oscilating field E a large proportion of the nonresonant ions, due to the combined action of the magnetic and static field, moves through region 33 and is ultimately discharged on a collector electrode 43.

In addition to the principal ion irradiating limited oscillator 24, this mass spectrometer is provided with a second radio frequency source 44 which is coupled by suitable means to the electrode or plate 36 in the analysis region of the spectrometer. The frequency of the second source 44 is selected to be $\omega_{c2}$, where $\omega_{c2}$ is the cyclotron resonance frequency in B of a secondary group of charged particles or ions as distinguished from the $\omega_c$ resonant ion. The strength of this second electric field, $E_2$, may be stronger than, equal to, or less than the electric field E and results in an increase in the translational energy of the secondary particles. Should these secondary ions be coupled or inter-related with the principal ion group, the inter-relationship will be evidenced by a detectable change in the absorption signal output from the spectrometer as recorded on the scope 30 or recorder 27.

Some of the simplest examples of ion-molecule reactions that can be studied by ion cyclotron double resonance include change transfer reactions between isotope species. Of additional interest, however, are ion-molecule reactions which produce unusual chemical species. For example Shannon et al., Journal of Chemical Physics, vol. 43, page 4201, (1965) have shown that species such as $N_2D^+$ can be produced from mixtures of $CD_4$ and $N_2$ in a mass spectrometer ion source. These same species can be readily observed with the cyclotron resonance technique.

The single resonance ion cyclotron spectrum of a mixture of $CD_4^+$ and $N_2^+$ is shown in FIG. 3. In addition to the parent ions $CD_4^+$ and $N_2^+$, the fragment $CD_3^+$ and the products of various ion-molecule reactions, i.e., $CD_5^+$ and $C_2D_5^+$, are also evident. The reaction products disappear as the total pressure is reduced. $N_2D^+$ does not disappear when the ionizing electron energy is reduced below the threshold for $N_2^+$ production. This suggests that the reaction $N_2+CD_4^+\rightarrow N_2D+CD_3$ is important for the production of $N_2D^+$.

The double resonance technique disclosed in the above noted Baldeschwieler application shows this interaction to be a fact as evidenced by FIGS. 4a and 4b. The $N_2D^+$ cyclotron resonance line observed with $\omega_c$ for $N_2D^+$ set at 285.5 kc.p.s. is shown in FIG. 4a. The $N_2D^+$ cyclotron resonance line observed when the $CD_4^+$ ion is simultaneously irradiated by a strong R.F. electric field at the $CD_4^+$ cyclotron resonance frequency $\omega_{c2}$ of 425.5 kc.p.s. is shown in FIG. 4b. Significant changes in the $N_2D^+$ intensity and line shape occur due to the double resonance.

In the system as shown in FIG. 1, the ratio of $\omega_c$ to $\omega_{c2}$ is set so that both ion resonances will occur simultaneously as the magnetic field B is slowly swept by the magnetic field regulator 26. This is accomplished with the three switches S in position 1. By switching to position 2, the magnetic field B is no longer swept, but the frequency $\omega_c$ of the first ion group is swept by means of the frequency modulator and sweep means while B is maintained constant and $\omega_{c2}$ also maintained at the cyclotron frequency of the second ion group. In position 3, the field and $\omega_c$ are maintained constant and the secondary ion group swept through their cyclotron resonance by a frequnecy sweep of the $\omega_{c2}$ signal output from generator 44.

A pulsed or modulation technique for double resonance mass spectrometers which forms the invention subject matter of this application is utilized in the system shown in FIG. 5. This system incorporates a signal generator 46 for pulsing the radio frequency oscillator 44 at a periodic rate, for example, 100 c.p.s. Thus, double resonance is applied in a periodic on-off manner. A phase detector, such as 31, is employed at the output of the amplifier and receives a reference signal from the signal generator 46. The output from the phase detector is proportional to the difference between the spectra without double resonance and the spectra with double resonance employed and is directly displayed. Only those products that are coupled to the irradiated species by chemical reaction will appear in the pulsed double resonance spectrum.

FIG. 6 shows the output signal recorded on recorder 27 when utilizing the system of FIG. 5 to investigate a mixture of $CD_4^+$ and $N_2^+$. The curve of FIG. 6 is proportional to the difference between the $N_2D^+$ cyclotron resonance when the $CD_4^+$ ion is irradiated and not irradiated in periodic on-off manner.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense. For example, other forms of cyclotron resonance mass spectrometers as well as forms of mass spectrometers other than the cyclotron resonance type may be employed for carrying out the present invention.

What is claimed is:

1. A mass spectrometer apparatus comprising means for forming ions from a sample, means for producing an electromagnetic field for exciting to resonance a first group of ions at the resonance frequency of said first group thus causing the translational energy of said first group of ions to be increased so that they may be detected, means for irradiating the ions of a second group of ions at the resonance frequency of said second group thus increasing the translational energy of said second group, means for modulating the radiation applied to the ions of said second group at a frequency lower than the resonance frequency of said second group wherein the translational energy of said second group is modulated, and means for detecting the resonance of said first group of ions so that the degree of coupling between the ions of said first and second groups can be determined.

2. A mass spectrometer as claimed in claim 1 wherein said means for exciting to resonance said first group of ions comprises means for producing a unidirectional magnetic field enveloping said ions and means for applying an alternating electric field to said ions and having a substantial component normal to said unidirectional magnetic field.

3. A mass spectrometer as claimed in claim 2 wherein said means for irradiating said second group of ions comprises means for applying a second alternating electrical field to said second group of ions and having a substantial component normal to said unidirectional magnetic field.

4. A mass spectrometer as claimed in claim 3 including means for sweeping said unidirectional magnetic field over a range of intensity to thereby sweep through the desired cyclotron resonance spectra.

5. A mass spectrometer as claimed in claim 3 including means for sweeping the frequency of one of the alternating electric fields applied to the ions to thereby sweep through the desired resonance spectra.

6. A mass spectrometer as claimed in claim 1 wherein said means for detecting the resonance of said first group of ions includes a phase detector, said phase detector receiving a reference signal from said modulating means.

7. A mass spectrometer as claimed in claim 6 wherein said means for exciting to resonance said first group of ions comprises means for producing a unidirectional magnetic field enveloping said ions and means for applying an alternating electric field to said ions and having a substantial component normal to said unidirectional magnetic field.

8. A mass spectrometer as claimed in claim 7 wherein said means for irradiating said second group of ions comprises means for applying a second alternating electrical field to said second group of ions and having a substantial component normal to said unidirectional magnetic field.

9. A mass spectrometer as claimed in claim 8 including a square wave generator means for modulating said second alternating electrical field at said lower frequency.

10. A mass spectroscopy technique for the study of ion-molecule reactions and other energy transformations among charged paritcles comprising the steps of exciting to resonance a first group of ions by irradiating them at their resonant frequency, exciting to resonance a second group of ions by irradiating them at their resonant frequency, modulating the irradiation applied to said second group of ions at a frequency lower than the resonant frequency of said second group, and determining the degree of interrelation between said first group of ions and said second group of ions by detecting the resonance of said first group and observing the effect thereon as a result of the modulation applied to said second group.

References Cited

UNITED STATES PATENTS 2,808,516   10/1957   Lanneau _____ 250—41.9
3,254,209   5/1966    Fite et al. _____ 250—41.9

OTHER REFERENCES

"Ion Cyclotron Resonance Spectrometer," by D. Wobschall, from "The Review of Scientific Instruments," vol. 36, No. 4, April 1965, pp. 466 to 475.

WILLIAM F. LINDQUIST, Primary Examiner